(12) United States Patent
Digele

(10) Patent No.: US 8,025,095 B2
(45) Date of Patent: Sep. 27, 2011

(54) HEAT EXCHANGER

(75) Inventor: Jörg Digele, Freiburg (DE)

(73) Assignee: Behr GmbH & Co. KG, Stuttgart (DE)

( * ) Notice: Subject to any disclaimer, the term of this patent is extended or adjusted under 35 U.S.C. 154(b) by 197 days.

(21) Appl. No.: 12/420,730

(22) Filed: Apr. 8, 2009

(65) Prior Publication Data
US 2009/0200003 A1    Aug. 13, 2009

Related U.S. Application Data

(63) Continuation of application No. 10/577,767, filed as application No. PCT/EP2004/010333 on Sep. 15, 2004, now abandoned.

(30) Foreign Application Priority Data

Oct. 29, 2003  (DE) .............................. 203 16 688 U

(51) Int. Cl.
*F28F 9/02* (2006.01)
(52) U.S. Cl. .......................... 165/158; 165/173; 165/905
(58) Field of Classification Search .................. 165/157, 165/158, 159, 173, 905, DIG. 401, DIG. 405, 165/DIG. 427, DIG. 432, DIG. 491, DIG. 492, 165/DIG. 499
See application file for complete search history.

(56) References Cited

U.S. PATENT DOCUMENTS

| | | |
|---|---|---|
| 3,001,766 A | 9/1961 | Laist |
| 3,489,209 A | 1/1970 | Johnson |
| 3,735,811 A | 5/1973 | Moser et al. |
| 3,804,161 A | 4/1974 | Nowak |
| 4,324,290 A | 4/1982 | Moranne |
| 4,590,888 A | 5/1986 | Mosig |
| 4,685,430 A | 8/1987 | Ap |
| 4,895,203 A | 1/1990 | McLaren |
| 5,058,661 A | 10/1991 | Oshiyama |
| 5,192,499 A | 3/1993 | Sakai et al. |
| 5,228,191 A | 7/1993 | Casterline |
| 6,311,678 B1 | 11/2001 | LePoutre |
| 2004/0188070 A1 | 9/2004 | Kruger et al. |
| 2004/0244946 A1 | 12/2004 | Schindler |

FOREIGN PATENT DOCUMENTS

| | | |
|---|---|---|
| DE | 44 31 135 A1 | 3/1996 |
| DE | 296 18 878 U1 | 12/1996 |
| DE | 197 49 620 A1 | 8/1998 |
| DE | 199 07 163 C2 | 10/1999 |
| DE | 101 57 285 A1 | 6/2003 |
| DE | 102 47 837 A1 | 4/2004 |

(Continued)

*Primary Examiner* — Teresa Walberg
(74) *Attorney, Agent, or Firm* — Foley & Lardner LLP

(57) ABSTRACT

Disclosed is a heat exchanger, particularly an exhaust gas heat exchanger for an internal combustion engine of a motor vehicle, comprising a housing jacket that is open at both ends, and a tube bundle which is inserted into said housing jacket and is penetrated by the hot exhaust gas. The aim of the invention is to produce said heat exchanger in an inexpensive and functionally safe manner. Said aim is achieved by the fact that only the tube bundle with the tube bottoms thereof, which are located on the front side, are made of metal while the housing jacket into which the tube bundle is inserted along with the tube bottoms is made of plastic. The dimensions of the transition between at least the tube bottom that is impinged upon by the hot medium entering the tube bundle on the feeding side are selected in such a way in the direction of the housing jacket that a drop in temperature that is sufficiently great regarding the thermal resistance of the plastic is definitely obtained all the way to the contact area on the housing jacket.

19 Claims, 1 Drawing Sheet

FOREIGN PATENT DOCUMENTS

| | | |
|---|---|---|
| DE | 699 10 099 T2 | 6/2004 |
| EP | 1 108 968 A1 | 6/2001 |
| EP | 0 930 429 B1 | 7/2003 |
| GB | 2 319 333 A | 5/1998 |
| JP | 61-101292 U | 6/1986 |
| JP | 11-013554 A | 1/1999 |
| JP | 2003-090693 A | 3/2003 |

HEAT EXCHANGER

CROSS-REFERENCE TO RELATED PATENT APPLICATIONS

This application is a Continuation of U.S. application Ser. No. 10/577,767, filed Aug. 16, 2006, which is the National Stage of International Application No. PCT/EP2004/010333, filed Sep. 15, 2004, which is based upon and claims the benefit of priority from prior Federal Republic of Germany Patent Application No. 203 16 688.4, filed Oct. 29, 2003, the entire contents of all of which are incorporated herein by reference in their entirety.

BACKGROUND

The invention relates to a heat exchanger, in particular an exhaust gas heat exchanger of an internal combustion engine of a motor vehicle.

Such a heat exchanger is known from EP 0 930 429 A2. The invention is concerned with the problem of being able to manufacture a heat exchanger of the generic type in a cost-effective and functionally reliable fashion.

SUMMARY OF THE PREFERRED EMBODIMENTS

The invention is based on the general idea that a heat exchanger to which a first hot medium is applied is constructed from an expensive material which is resistant to the hot temperatures only at the locations where this is absolutely necessary and otherwise to provide as large an area as possible which is isolated from hot temperatures requiring expensive contact materials in order to be able to manufacture this isolated area from a more cost effective material. With the heat exchanger of the generic type this is achieved in that the area of the heat exchanger which lies axially on the inside and through which the first hot gas flows is connected in a thermally isolated fashion to an outer jacket housing into which the axially inner part can be inserted. In this case, the outer jacket is manufactured in particular from a plastic which is more cost effective than metal. If the housing jacket is manufactured from plastic, securing elements and other attachments can easily be integrally formed onto it.

In the interior of the heat exchanger it is possible to secure plastic baffles by inserting them in a positively locking fashion between the housing jacket and the inner area lying axially inside the housing jacket.

The axially fixed, and moreover seal-forming, connection which is necessary between one of the tube bottoms and the housing jacket on an end side of the heat exchanger can be brought about by beading the tube bottom about an annular web on the housing jacket. Beading techniques which are known per se for such purposes can be used for this.

BRIEF DESCRIPTION OF THE DRAWING

An advantageous exemplary embodiment of the invention which is described in more detail below is illustrated in the drawing, in which.

DETAILED DESCRIPTION OF THE PREFERRED EMBODIMENTS

Figure 1:
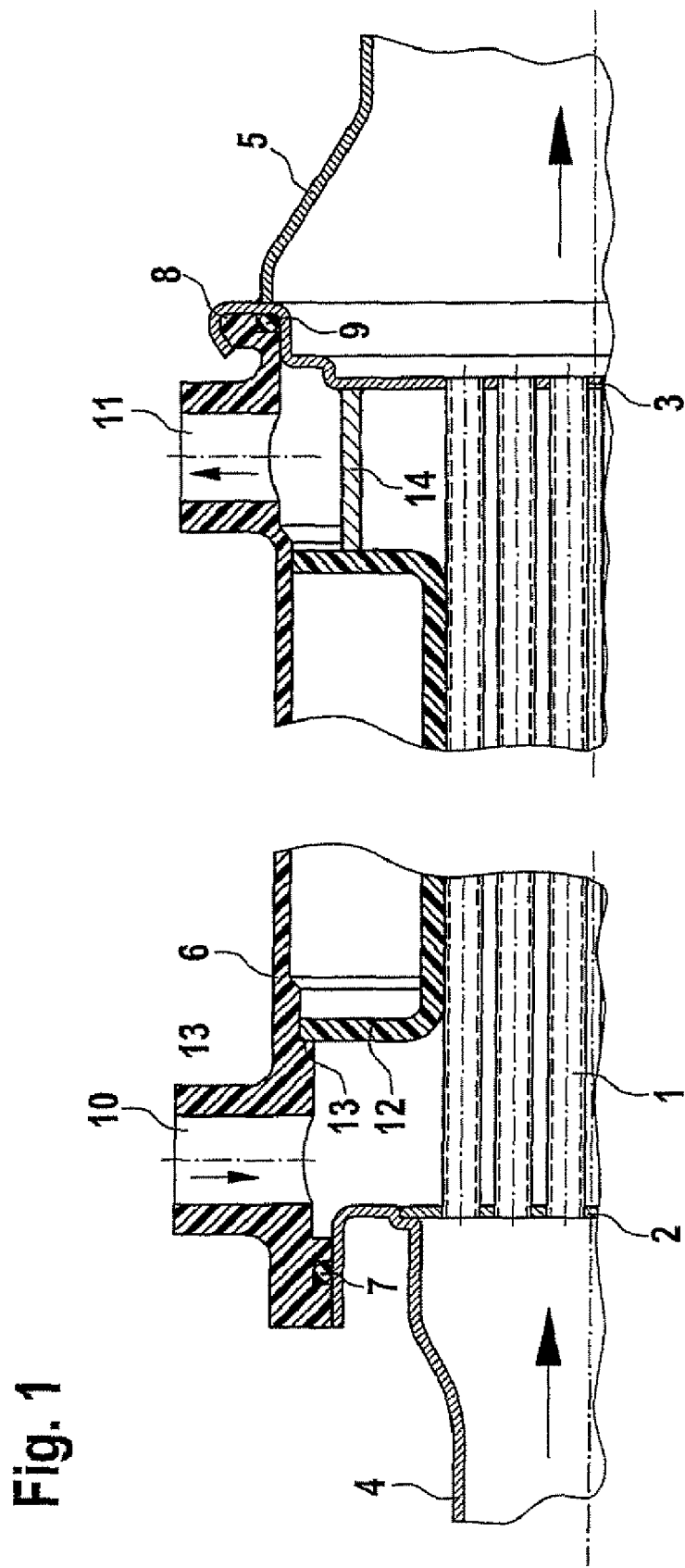
FIG. 1 shows a longitudinal section through an exhaust gas heat exchanger of an internal combustion engine of a motor vehicle.

The heat exchanger has, as a through-flow area for hot exhaust gas of an internal combustion engine, a tube bundle composed of individual tubes 1 through which hot exhaust gas flows axially on the inside in the direction of the arrows given in the drawing. The individual tubes 1 of the tube bundle are held in a seal-forming and secure fashion at their ends in tube bottoms 2 and 3. An exhaust gas feed connector 4 is securely connected to the tube bottoms 2 and 3 at the inlet end of the heat exchanger, and an exhaust gas discharge connector 5 is connected thereto at the outlet end.

The second bottom 2 is mounted in an axially displaceable seal-forming fashion in an axially hollow housing jacket 6 by the tube bottoms. The seal-forming mounting ensures a first sealing ring 7 which is provided radially between the second tube bottom 2 and the housing jacket 6.

At the outlet end of the heat exchanger, the first tube bottom 3 which is located there is connected in an axially secured fashion to the housing jacket 6. This axially secure and seal-forming connection is composed of a beaded connection in which the first tube bottom 3 is beaded about an annular web 8 of the housing jacket in a fashion which is known for such purposes. A second annular seal 9 ensures that there is a seal-forming connection between the annular web 8 of the housing jacket 6 and the first tube bottom 3.

The housing jacket 6 has a coolant inlet connector 10 and an outlet connector 11 at its end circumferential regions, these two connectors being attached at opposite ends and coolant flowing through them in accordance with the flow arrows entered in the drawing.

A baffle 12 which ensures a uniform flow through the intermediate spaces between the individual tubes 1 in the axial direction is inserted within the housing jacket 6 in the outer annular region between the housing jacket 6 and the outer circumference which is formed jointly by the individual tubes 1. The baffle 12 which is composed of an annular web at each of its end sides and a tubular section which is enclosed circumferentially between said annular webs is merely clamped in between an annular step 13 of the housing jacket 6 and the first tube bottom 3. In order to provide axial support on the tube bottom 3, a plurality of axial support struts 14 are provided distributed over the circumference of the baffle 12 in the region of the outlet connector 11.

While the individual tubes 1 and the tube bottoms 2 and 3 are composed of a metal which is resistant to the exhaust gas temperatures, the housing jacket 6 and the baffle 12 are composed of a plastic which is less resistant to high temperature.

In an exhaust gas heat exchanger, the exhaust gas can enter the individual tubes 1 at, for example, a temperature of approximately 700° C. In the area through which the coolant flows and which adjoins the housing jacket 6 and the baffle 12 there is a temperature of approximately 100° C. Given such temperature conditions, a temperature reduction to approximately 200° C. can be achieved in the area of the second tube bottom 2 which is in contact with the housing jacket 6 at the inlet end of the heat exchanger. At such a temperature, it is already possible to use plastics for the housing jacket 6 which can be manufactured extremely economically.

The heat exchanger in the drawings can be manufactured as follows. The tube bundle composed of individual tubes 1 which is connected to the tube bottoms 2, 3 including the feed and discharge connectors 4 and 5 is simply inserted, to be precise from right to left in the example shown, into a housing jacket 6 which is formed from plastic and is of conical design. The feed and discharge connectors 4, 5 can, of course, also only be subsequently welded on to the tube bottoms 2, 3. When the tube bundle composed of individual tubes 1 is inserted into the housing jacket 6, the baffle 12 can also be inserted. The tube bundle which is inserted into the housing jacket 6 is finally connected to its first tube bottom 3 in the way described above in a secure fashion by means of an end annular web 8 of the housing jacket 6 and in a seal-forming fashion using the second seal 9.

By virtue of the "loose mounting" of the tube bundle within the housing jacket 6 by means of the second tube bottom 2 it is possible to prevent different rates of thermal expansion and oscillations between the tube bundle and the housing jacket 6 from putting at risk the necessary high degree of durability of the heat exchanger. Apart from the efficient manufacturability of the heat exchanger according to the invention, this is a significant advantage which is achieved by the invention.

LIST OF REFERENCE NUMERALS

1 Individual tubes
2 Second tube bottom
3 First tube bottom
4 Feed connector
5 Discharge connector
6 Housing casing
7 First sealing ring
8 Annular web
9 Second annular seal
10 Inlet duct
11 Outlet duct
12 Baffle
13 Annular step
14 Support strut

The invention claimed is:

1. A heat exchanger, comprising:
a housing jacket which is open at both ends, and wherein:
   a bundle including a plurality of individual tubes which are spaced apart from one another is located inside the housing jacket,
   the individual tubes of the bundle of tubes are held firmly and in a seal-forming fashion by end-side tube bottoms,
   the tube bottoms form end-side closures of the housing jacket,
   a first tube bottom of the tube bottoms is directly connected to the housing jacket firmly and in a seal-forming fashion,
   a second tube bottom of the tube bottoms is mounted within the housing jacket housing in an axially displaceable and seal-forming fashion,
   the individual tubes are configured axially on an inside of the individual tubes for a first hot medium to flow through the individual tubes,
   the tubes are located axially in a space which is formed by the housing jacket, wherein the housing jacket is configured for a second medium which is cooler than the first hot medium to flow axially through the housing jacket,
   the individual tubes and at least the second tube bottom are located on a hot inlet side of the heat exchanger and are made of a heat-resistant metal,
   the housing jacket is composed of a material which is not heat-resistant, at least at a temperature at which the first medium enters the heat exchanger,
   the second tube bottom located on the inlet side for the first hot medium has, before the second tube bottom bears against the housing jacket, an intermediate region which is subjected directly to the second medium within the housing jacket and has dimensions which ensure cooling to a temperature at which the material of the housing jacket still has sufficient resistance to heat.

2. The heat exchanger as claimed in claim 1, wherein the resistance to heat of the material of the housing jacket is at least 100° C. below an inlet temperature of the first medium into the heat exchanger.

3. The heat exchanger as claimed in claim 2, wherein the housing jacket is made of plastic.

4. The heat exchanger as claimed in claim 2, wherein a fixed connection between the first tube bottom and the housing jacket is a beaded connection in which the first tube bottom is wrapped about an annular web of the housing jacket.

5. The heat exchanger as claimed in claim 2, wherein at least one flow baffle made of plastic is inserted within a space lying radially between the tube bundle and the housing jacket.

6. The heat exchanger as claimed in claim 5, wherein the plastic baffle is secured in an exclusively positively engaging fashion in an axial direction between one of the tube bottoms and the other tube bottom or the housing jacket.

7. The heat exchanger as claimed in claim 2, wherein the resistance to heat of the material of the housing jacket is at least 300° C. below an inlet temperature of the first medium into the heat exchanger.

8. The heat exchanger as claimed in claim 1, wherein the housing jacket is made of plastic.

9. The heat exchanger as claimed in claim 8, wherein a fixed connection between the first tube bottom and the housing jacket is a beaded connection in which the first tube bottom is wrapped about an annular web of the housing jacket.

10. The heat exchanger as claimed in claim 8, wherein at least one flow baffle made of plastic is inserted within a space lying radially between the tube bundle and the housing jacket.

11. The heat exchanger as claimed in claim 10, wherein the plastic baffle is secured in an exclusively positively engaging fashion in an axial direction between one of the tube bottoms and the other tube bottom or the housing jacket.

12. The heat exchanger as claimed in claim 1, wherein a fixed connection between the first tube bottom and the housing jacket is a beaded connection in which the first tube bottom is wrapped about an annular web of the housing jacket.

13. The heat exchanger as claimed in claim 12, wherein at least one flow baffle made of plastic is inserted within a space lying radially between the tube bundle and the housing jacket.

14. The heat exchanger as claimed in claim 13, wherein the plastic baffle is secured in an exclusively positively engaging fashion in an axial direction between one of the tube bottoms and the other tube bottom or the housing jacket.

15. The heat exchanger as claimed in claim 12, wherein the first tube bottom is wrapped around the annular web of the housing jacket such that the first tube bottom is in direct contact with a surface substantially perpendicular to a longitudinal axis of the heat exchanger and is in direct contact with a surface substantially parallel to the longitudinal axis of the heat exchanger.

16. The heat exchanger as claimed in claim 1, wherein at least one flow baffle made of plastic is inserted within a space lying radially between the tube bundle and the housing jacket.

17. The heat exchanger as claimed in claim 16, wherein the plastic baffle is secured in an exclusively positively engaging fashion in an axial direction between one of the tube bottoms and the other tube bottom or the housing jacket.

18. A heat exchanger, comprising:
a housing jacket with openings at both ends of the housing jacket, a bundle including a plurality of individual tubes that are spaced apart from one another, wherein the bundle of tubes is located inside the housing jacket, and tube bottoms, wherein the tube bottoms are located at the openings at the ends of the housing jacket, wherein the individual tubes of the bundle of tubes are held firmly and in a seal-forming manner by the tube bottoms, wherein the tube bottoms form end-side closures of the housing jacket, wherein a first tube bottom of the tube bottoms is directly connected to the housing jacket firmly and in a seal-forming manner, wherein a second tube bottom of the tube bottoms is mounted within the housing jacket in an axially displaceable and seal-forming manner, wherein the heat exchanger is configured so that a first hot medium flows through the individual tubes, wherein the housing jacket is configured so that a second medium that is cooler than the first medium flows axially through the housing jacket, wherein the individual tubes and the second tube bottom are made of a heat-resistant metal, wherein the housing jacket is composed of a material that is not heat-resistant, at least at a temperature at which the first medium enters the heat exchanger.

19. The heat exchanger as claimed in claim 18, wherein a fixed connection between the first tube bottom and the housing jacket is a beaded connection in which the first tube bottom is wrapped about an annular web of the housing jacket, wherein the first tube bottom is wrapped around the annular web of the housing jacket such that the first tube bottom is in direct contact with a surface substantially perpendicular to a longitudinal axis of the heat exchanger and is in direct contact with a surface substantially parallel to the longitudinal axis of the heat exchanger.

* * * * *